United States Patent
Solem et al.

(10) Patent No.: US 11,030,235 B2
(45) Date of Patent: Jun. 8, 2021

(54) METHOD FOR NAVIGATING THROUGH A SET OF IMAGES

(71) Applicant: Facebook, Inc., Menlo Park, CA (US)

(72) Inventors: Jan Erik Solem, Bjärred (SE); Yubin Kuang, Lund (SE); Johan Gyllenspetz, West Hollywood, CA (US); Peter Neubauer, Malmö (SE); Pau Gargallo Piracés, Barcelona (ES)

(73) Assignee: Facebook, Inc., Menlo Park, CA (US)

( * ) Notice: Subject to any disclaimer, the term of this patent is extended or adjusted under 35 U.S.C. 154(b) by 208 days.

(21) Appl. No.: 16/066,719

(22) PCT Filed: Dec. 27, 2016

(86) PCT No.: PCT/EP2016/082705
§ 371 (c)(1),
(2) Date: Jun. 28, 2018

(87) PCT Pub. No.: WO2017/118585
PCT Pub. Date: Jul. 13, 2017

(65) Prior Publication Data
US 2019/0018861 A1    Jan. 17, 2019

(30) Foreign Application Priority Data
Jan. 4, 2016    (SE) .................................. 1650001-9

(51) Int. Cl.
*G06F 16/54* (2019.01)
*G06F 16/29* (2019.01)
(Continued)

(52) U.S. Cl.
CPC ......... *G06F 16/54* (2019.01); *G01C 21/3647* (2013.01); *G06F 16/24578* (2019.01);
(Continued)

(58) Field of Classification Search
CPC ....... G06F 16/54; G06F 16/5838; G06F 16/51
See application file for complete search history.

(56) References Cited

U.S. PATENT DOCUMENTS

| 8,732,187 B1 | 5/2014 | Jing et al. |
| 2007/0110338 A1* | 5/2007 | Snavely ............. G06K 9/00697 |
| | | 382/305 |

(Continued)

FOREIGN PATENT DOCUMENTS

| EP | 2 672 232 A2 | 12/2013 |
| GB | 2 440 562 A | 2/2008 |

(Continued)

OTHER PUBLICATIONS

Arpa, A. et al;"CrowdCam: Instantaneous Navigation of Crowd Images Using Angled Graph", 2013 International Conference on 3D Vision—3DV 2013, pp. 422-429.

(Continued)

*Primary Examiner* — Loc Tran
(74) *Attorney, Agent, or Firm* — Van Pelt, Yi & James LLP

(57) ABSTRACT

The present invention relates to a method for navigating through a set of images depicting a scenery, said method comprising: receiving information relating to a subset of images within said set of images, said information comprising metadata of each image, said subset of images comprising images being acquired from a geographical position, which is within a bounding area surrounding the geographical position of a current image within the set of images; receiving weight information, said weight information controlling weights to be given to a plurality of different measures of similarities based on different types of metadata; and calculating a plurality of combined measures of similarity for pairs of images in the subset of images, said (Continued)

calculating being performed using said metadata and said weight information.

20 Claims, 3 Drawing Sheets

(51) Int. Cl.
| | |
|---|---|
| *G06F 16/9537* | (2019.01) |
| *G06F 16/58* | (2019.01) |
| *G01C 21/36* | (2006.01) |
| *G06F 16/583* | (2019.01) |
| *G06F 16/51* | (2019.01) |
| *G06F 16/2457* | (2019.01) |

(52) U.S. Cl.
CPC .............. *G06F 16/29* (2019.01); *G06F 16/51* (2019.01); *G06F 16/5838* (2019.01); *G06F 16/5866* (2019.01); *G06F 16/9537* (2019.01)

(56) References Cited

U.S. PATENT DOCUMENTS

| | | |
|---|---|---|
| 2010/0325589 A1 | 12/2010 | Ofek et al. |
| 2013/0222369 A1 | 8/2013 | Huston et al. |
| 2015/0153933 A1 | 6/2015 | Filip et al. |

FOREIGN PATENT DOCUMENTS

| | | |
|---|---|---|
| WO | WO 9624216 A1 | 8/1996 |
| WO | WO 2011/067713 A2 | 6/2011 |
| WO | WO 2012/164542 A2 | 12/2012 |
| WO | WO 2013/109742 A1 | 7/2013 |

OTHER PUBLICATIONS

Pollefeys et al; "Detailed Real-Time Urban 3D Reconstruction from Video", International Journal of Computer Vision, vol. 78, No. 2-3, pp. 143-167, 2007.

\* cited by examiner

METHOD FOR NAVIGATING THROUGH A SET OF IMAGES

CROSS REFERENCE TO RELATED APPLICATIONS

This application is the National Stage Entry under 35 U.S.C. § 371 of Patent Cooperation Treaty Application No. PCT/EP2016/082705, filed Dec. 27, 2016, which claims priority from Sweden Application No. 1650001-9, filed Jan. 4, 2016, the contents of which are hereby incorporated by reference herein.

TECHNICAL FIELD

The present invention relates to a method for navigating through a set of images depicting a scenery.

BACKGROUND

In the information age of today, the use of images is becoming increasingly popular. In particular, images depicting the world surrounding us are frequently used for all kinds of purposes. The images may be available via Internet, such that people may have access to the images from a web browser on a computer or a mobile phone. For instance, images of places may be associated with a map such that it is possible for a user to look at a view of a point of interest on the map or that a user may be presented with views along a route for facilitating finding the way between two locations.

Also, images may easily be captured e.g. by means of pocket-size cameras or mobile phones that are provided with a camera function. In fact, many people carry a camera in their mobile phone all the time and are able to take a photo whenever it is desired. Hence, a database of images of the world surrounding us may quickly be provided with a large number of images if any user in the world is allowed to contribute images to the database.

An application that enables a user to navigate, i.e. to switch the image that is being viewed in order to experience moving through a scenery, through a set of images in a database may be optimized for providing the best possible experience to the user navigating through the images. Typically, the database is provided with the images that are desired for providing a good experience to the user and relationships between the images are defined in order to correlate the images to each other such that navigation through the images is provided in a desired manner. The correlation of the images to each other may be adapted to the specific application in order to optimize the experience provided to the user as the user navigates through the images.

An example of an application providing navigation through images that may be captured by users of an application is described in Arpa, A. et al, "CrowdCam: Instantaneous Navigation of Crowd Images Using Angled Graph", 2013 International Conference on 3D Vision—3DV 2013, pages 422-429. The application provides a possibility for users to capture photos of an event and to share the photos to take advantage of each other's perspectives such that navigation through views of the event from different perspectives is possible. The photos are represented as vertices of a weighted graph, where edge weights describe similarity between pairs of images. Angles of the graph are defined as a pair of edges with a common vertex. The weighted graph may be augmented with a set of angles forming a weighted angle graph including angle weights, which penalize turning along the corresponding angle. The weighted angled graph is formed so as to promote straight paths through the graph. Hence, the weighted angled graph is also constructed so as to adapt the weights to the desired experience when a user navigates through the graph.

In order to enable a user to navigate through images using an application for a specific purpose, the provider of the application needs to collect the set of images through which navigation is to be enabled. This implies that several providers may need to collect images of the same scenery in order to each be able to provide their application to users. It would therefore be desirable to enable use of one database of images for several types of applications such that the respective providers of applications need not collect their own set of images.

In WO 96/24216, an image system is disclosed. The image system captures, along with the images, information defining both the position and the orientation of the camera along with the distance to the subject. The images may then be presented to the user in a three-dimensional display in which the user can navigate through the images. When an image is displayed, a computer program may calculate frames that are in a specific relation to the currently displayed image (e.g. in a forward or backward direction). Based on an operator specified radius, the candidate frames that are depicting a field of view in the desired directions, may be determined. Then, a weighted rating of the relation between the current image and the candidate frames may be calculated to determine frames relevant for navigation. However, when the displayed image is switched, the computer program will need to update the determination of candidate frames in relation to the new displayed image.

SUMMARY OF THE INVENTION

It is an object of the invention to at least partly overcome the above-identified problems. It is another object of the invention to provide a method in relation to navigation through a set of images depicting a scenery, wherein intelligent navigation through the set of images is enabled.

These and other objects of the invention may at least partly be met by means of the invention as defined by the independent claims. Preferred embodiments are set out in the dependent claims.

According to a first aspect of the invention, there is provided a method for navigating through a set of images depicting a scenery, said method comprising: receiving information relating to a subset of images within said set of images, said information comprising metadata of each image within said subset of images, said metadata including at least a geographical position of an image capturing sensor when acquiring the image, a viewing angle of the image capturing sensor when acquiring the image, and image property information, said subset of images comprising images being acquired from a geographical position, which is within a bounding area surrounding the geographical position of a current image within the set of images; receiving weight information for determining similarities between images within said subset of images, said weight information controlling weights to be given to a plurality of different measures of similarities between images based on different types of metadata; and calculating a plurality of combined measures of similarity for pairs of images in the subset of images, wherein a plurality of combined measures of similarity represent a similarity between the current image and an image within said subset of images and a plurality of combined measures of similarity represent a similarity between pairs of images in the subset of images not including the current image, said calculating being performed using said metadata and said weight information.

According to a second aspect of the invention, there is provided a computer program product comprising a computer-readable medium with computer-readable instructions such that when executed on a processing unit the computer program will cause the processing unit to perform the method according to the first aspect of the invention.

According to the invention, relations between images are not calculated before a navigation through the set of images is to be performed. Rather, metadata about each image in the set of images has been collected and may be stored in a database. When navigation through the set of images is to be performed, only metadata of a subset of images need be retrieved from a database. This implies that images within a bounding area, defining an area of interest around a current image, are considered. The measure of similarity between the current image and an image within the subset of images may be calculated during navigation, when the measure is actually needed. Since calculations are only performed for images within a bounding area, the number of measures of similarity to be calculated is limited and it is possible to perform the calculations during navigation.

Further, the calculations include determining a plurality of combined measures of similarity between pairs of images, wherein the pair does not include the current image. Hence, when display of image is switched to another image in the subset of images, relations between this image and other images within the subset of images may already have been calculated. Thus, navigation through the images by switching the image displayed a number of times may be very quickly performed.

The metadata may comprise information defining several different aspects of the image. Therefore, the combined measure of similarity may take into account several aspects of similarity.

Further, the combined measure of similarity is calculated based on weight information to control weights to be given to the plurality of measures of similarities. The weight information may e.g. control which aspect of similarity that is most important in order to provide a best ranked transition image in relation to a current image based primarily on an aspect of choice. Hence, an application may define weight information in order to be able to determine a best ranked transition image that best fits the experience of navigation that the application wants to provide to a user.

Several different applications may use the possibility to provide input for navigation, so that each application may set its desired weights of the plurality of measures of similarities. Therefore, the several different applications may utilize the same set of images in order to each make use of the same set of images for presenting navigations through images.

In other words, the weights of the plurality of measures of similarities of may be dynamically controlled. The dynamic control may ensure that the weights fit the application that makes use of the set of images.

The bounding area may define any type of area surrounding the geographical position of the current image, such as a circle or a polygon, e.g. a rectangle.

The subset of images may be selected from the set of images based on one or more features defined by metadata of each image. The subset of images may comprise all images within a geographical area around the geographical position of the current image. Hence, the subset may be selected based on metadata relating to the geographical position. Additionally, or alternatively, the subset may be selected based on other criteria, such as a time of capture of the image, a user capturing the image, or a viewing angle of the image.

The definition of the subset of images, e.g. based on a given time interval, user permissions, or other filters based on any metadata property, enables selection of images of interest to be used in navigation. Then, measures of similarity may be calculated based only on the subset of images, allowing generation of such measures on the fly, instead of requiring that a large database with pre-computed measures of similarity is provided.

In the context of the present application, the term "scenery" should be construed as any type of real-life environment that may be depicted in an image. Hence, the set of images may for instance depict a landscape, an urban environment, indoor or outdoor environment. Also, the set of images depicting a scenery does not imply that each of the images in the set share some common area being depicted. In fact, the set of images may include a number of images of different parts of a town, so that the term "scenery" should include a large area that may not be depicted in a single image. In fact, the set of images may together depict a very large area, such as an entire town, a country, or even large parts of the world.

Further, the term "image capturing sensor" should be construed as the actual sensor that is capturing an image, such as a charge-coupled device (CCD) sensor or a complementary metal-oxide semiconductor (CMOS) sensor. The image capturing sensor may acquire the information that forms the image, such as an array of pixel values. The image capturing sensor is thus typically part of a larger device, which may comprise further sensors for acquiring supplemental information relating to the image.

According to an embodiment, the method further comprises determining at least one best ranked transition image among the images within said subset of images based on said plurality of combined measures of similarity.

The term "at least one best ranked transition image" should be construed as one best ranked transition image or a list of two or more best ranked transition images. In some embodiments, it may be desirable to obtain a list of the k best ranked transition images. The list may be presented in a descending order according to rank, such that the individually best ranked image is presented first in the list. Then, an application or a user may select one of the listed images to be viewed so that an alternative to the individually best ranked image may be selected.

According to an embodiment, the method further comprises creating a graph representation of the images within said subset of images, said graph representation comprising nodes and edges, wherein a node represents an image and an edge represents a transition between two images and comprises a combined measure of similarity between the two images, said creating of the graph representation comprising said calculating of a plurality of combined measures of similarity.

By means of creating a graph representation, transitions between several pairs of images in the subset of images are determined. This implies that a local graph for navigation around the current image is created allowing quickly determining best ranked transition images through a plurality of transitions between images in the graph. The graph may be formed using the weight information, such that the graph weighs image features according to a dynamic choice that fits the application.

According to an embodiment, the method further comprises classifying a transition between two images into a class among a predefined, finite number of transition classes, wherein each predefined transition class defines a type of transition between the two images according to a difference in the geographical position and a difference in the viewing angle of the images.

The predefined, finite number of transition classes may define typically desired types of transitions. By classifying a transition between two images into a class, it is simple to decide a best ranked transition image within a specific class, which may be a typically desired type of transition.

According to an embodiment, said determining of said at least one best ranked transition image comprises determining the transition class of a transition from the current image to the at least one best ranked transition image, and wherein the method further comprises outputting an indication of the transition class(es) of the at least one best ranked transition image for display.

By classifying transitions into predefined transition classes, available types of transitions may be indicated in a user interface for navigating through the set of images.

According to an embodiment, said metadata includes a three-dimensional reconstruction index, which indicates that the image is part of a particular sub-model of three-dimensional structure of objects in the scenery having the three-dimensional reconstruction index.

Three-dimensional structures of objects in the scenery may be formed based on the set of images. A number of sub-models providing three-dimensional structures of objects may be formed based on the images. Each sub-model may define relative positions and viewing angles of the image capturing sensors for each image as well as the three-dimensional structures of objects. The forming of sub-models may act to update a geographical position and/or viewing angle of an image based on information from other images in the set of images. When two images are part of a common sub-model, it is an indication that the images are tightly related, and that a smooth transition between the images may be achieved.

Thanks to the metadata including a three-dimensional reconstruction index, the metadata provides information of what sub-model(s) the image has been part of forming. Thus, the three-dimensional reconstruction index may be used as a part of the measure of similarity. If two images share a three-dimensional reconstruction index, it is an indication that there is a large similarity between the images.

According to an embodiment, the bounding area is updated based on navigation through the set of images and metadata of an updated subset of images within the updated bounding area is received, and wherein said calculating and determining is performed based on the updated subset of images.

Thus, during navigation through the set of images, an updated subset of images may continuously be provided in order to anticipate future choices of images to be presented. The bounding area may be updated in relation to navigation such that the bounding area may have a large geographical extension in a direction of movement through the scenery.

According to an embodiment, the bounding area is determined in dependence on the viewing angle of the current image. The bounding area may for instance have a large geographical extension in a direction corresponding to the viewing angle of the current image, since there may be a high likelihood that navigation through the scenery in that direction is desired. Similarly, there may be a high likelihood that navigation in a completely opposite direction to the viewing angle of the current image is desired, so the bounding area may also have a large geographical extension in such direction.

According to an embodiment, the method further comprises sending a request for information relating to a subset of images, wherein said request comprises an indication of the current image. Thus, the method may start by an application sending a request to obtain information for determining a best ranked transition image, said request including an indication of the current image. Then, the information necessary for performing the calculations may be sent to the application in order to enable the application to perform the calculations locally using the presently desired weight information.

According to a third aspect of the invention, there is provided a method for navigating through a set of images depicting a scenery, said method comprising: receiving information relating to a subset of images within said set of images, said information comprising metadata of each image within said subset of images, said metadata including at least a geographical position of an image capturing sensor when acquiring the image, a viewing angle of the image capturing sensor when acquiring the image, and image property information, said subset of images comprising images being acquired from a geographical position, which is within a bounding area defined in relation to a start geographical position of navigation and a target geographical position of navigation; receiving weight information for determining similarities between images within said subset of images, said weight information controlling weights to be given to a plurality of different measures of similarities between images based on different types of metadata; calculating a plurality of combined measures of similarity between pairs of images in the subset of images, each combined measure of similarity representing a similarity between the images in a pair of images within said subset of images, said calculating being performed using said metadata and said weight information; determining a best ranked path from a first image in the subset of images to a second image in the subset of images, wherein the first image has a geographical position within a distance from the start geographical position that is smaller than a set threshold, the second image has a geographical position within a distance from the target geographical position that is smaller than a set threshold, and the path comprises a number of transitions between images from the first image via intermediate images to the second image; said determining comprising: calculating a transition measure of a path from the first image to the second image as a sum of the combined measures of similarity between pairs of images included in the transitions; and selecting the best ranked path based on a comparison of the transition measures for paths from the first image to the second image.

The third aspect of the invention has similar advantages to the first aspect of the invention. According to the third aspect of the invention, a path for providing a smooth transition from a first image to a second image, via a number of intermediate images, may be determined when navigation through the set of images is to be performed. Further, only metadata of a subset of images need be retrieved from a database in order to determine the best ranked path.

The path may be determined based on the weight information, which may be dynamically set and adapted to the specific application that is to present the transition between images along the path.

The bounding area may define any type of area surrounding the start geographical position of navigation and a target geographical position of navigation, such as a circle or a polygon, e.g. a rectangle. The bounding area may for instance define an area surrounding a straight line connecting the start geographical position to the target geographical position. The bounding area may have a width allowing navigation through the scenery to deviate from the straight line.

The start geographical position or the target geographical position may be set to a geographical position from which a current image, which is presented to a user by an application, was acquired. Alternatively, the start geographical position and/or the target geographical position may be set to a position indicated by a user on a map, or provided in some other manner.

According to an embodiment, the method further comprises receiving an indication of a target geographical position as a distance in a direction relative to a viewing angle of a current image.

For instance, it may be desired that navigation through the scenery is performed a certain distance along a direction, or in an opposite direction, of the viewing angle of the current image. The indication of the target geographical position may thus be used as input for determining the subset of images.

The best ranked path may thus define a transition from a start image through a plurality of intermediate images to a target image, and the plurality of intermediate images may be presented as a sequence of images for presenting a smooth transition from the start image to the target image to a user.

According to an embodiment, the method further comprises creating a graph representation of the images within said subset of images, said graph representation comprising nodes and edges, wherein a node represents an image and an edge represents a transition between two images and comprises a combined measure of similarity between the two images, said creating of the graph representation comprising said calculating of a plurality of combined measures of similarity, wherein said determining of a best ranked path includes calculating a transition measure as a sum of the combined measures of similarity of edges connecting a starting node representing the first image and a target node representing the second image in the graph.

By means of creating a graph representation, transitions between several pairs of images in the subset of images are determined. This implies that a local graph for navigation around the current image is created allowing quickly determining best ranked paths through a plurality of transitions between images in the graph. The graph may be formed using the weight information, such that the graph weighs image features according to a dynamic choice that fits the application.

According to a fourth aspect of the invention, there is provided a method for navigating through a set of images depicting a scenery, said method comprising: receiving images depicting the scenery; storing images in a database; calculating sub-models of three-dimensional structures of objects in the scenery based on at least part of the received images, wherein each sub-model is assigned a three-dimensional reconstruction index; storing metadata of the received images in a database, said metadata including at least a geographical position of an image capturing sensor when acquiring the image, a viewing angle of the image capturing sensor when acquiring the image, image property information, and a three-dimensional reconstruction index, which indicates that the image is part of a particular sub-model of three-dimensional structure of objects; receiving, from a requestor, a request for navigation through the scenery including at least one geographical position in the scenery; determining a subset of images being acquired from a geographical position, which is within a bounding area surrounding the at least one geographical position in the scenery; and sending metadata of the subset of images to the requestor.

Thanks to the fourth aspect of the invention, there is provided a set of images, which may be stored in a common location. Further, metadata may be extracted and stored in a separate, or the same, database as the images. The database(s) thus provides information allowing navigation through a scenery.

When navigation through the scenery is desired, metadata of a subset of images may be provided. The subset of images may be within a bounding area such that navigation around a specific geographical position may be enabled. Further, only the metadata need to be provided in order to allow e.g. an application presenting the navigation, to determine transitions between images in order to decide which images that are to be presented. The image need not be provided to the application until it is actually to be presented.

Further, thanks to the metadata including a three-dimensional reconstruction index, the metadata provides information of what sub-model(s) an image has been part of forming. Thus, the three-dimensional reconstruction index may be used as a part of a measure of similarity to be computed based on metadata of images. If two images share a three-dimensional reconstruction index, it is an indication that there is a large similarity between the images.

BRIEF DESCRIPTION OF DRAWINGS

These and other aspects of the present invention will now be described in further detail, with reference to the appended drawings showing embodiment(s) of the invention.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

A plurality of images may depict a scenery from different positions and at different viewing angles. The plurality of images may allow navigation through the scenery by e.g. the images being presented in a sequence. In order to allow navigation through the scenery, a plurality of images may be acquired and relations between the images may be determined.

Each image is acquired by an image capturing sensor in a position and at a viewing angle, i.e. a direction in which the image capturing sensor is aimed. The position and viewing angle may be useful information in order to choose an image to be presented during navigation through the scenery and in order to adapt a presentation or displaying of the image. In forming a basis for navigation through the scenery, it may further be of interest to create a model of the scenery based on the plurality of images.

Hence, having a plurality of acquired images depicting a scenery, it is desired to create a model of the scenery and to determine position and viewing angles of image capturing sensors that acquired the images.

Thus, three-dimensional structures of objects in the scenery are to be modeled. It should be understood that the structure could be of any form and represent any object. The plurality of images can be arranged in arbitrary order and taken from any position. The plurality of images can further be taken both inside and outside of a structure or object.

When acquiring an image, a unit in which the image capturing sensor is arranged may also determine additional information, e.g. by means of other sensors in the unit. For instance, a camera may acquire a GPS position and compass information providing a detection of the position and viewing angle of the camera when the image was acquired. This information may be acquired with low accuracy, but may be provided as input in analysis of the plurality of images for determining a model of the scenery having higher accuracy.

Figure 1:
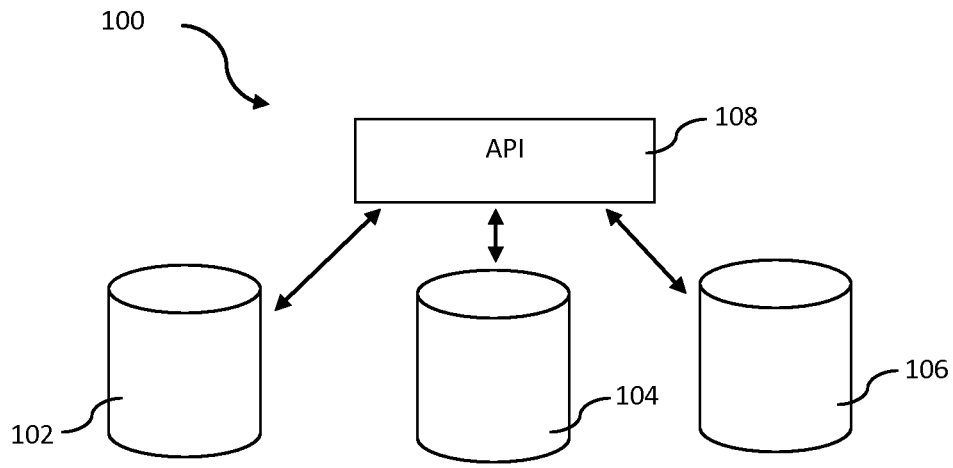
FIG. 1 is a schematic view of a system having databases storing a set of images.

Referring now to FIG. 1, a set of images depicting a scenery may be collected in a system 100. The system 100 may receive images from a plurality of different image capturing sensors. It may be contemplated that a lot of different users may contribute by capturing images and uploading such images to the system 100.

The system 100 may store images in a first database 102. Further, metadata about the images may be determined. The metadata may be stored in a second database 104, which may be different from the first database 102. Hence, information about the images which may allow relating the images to each other may be separately stored from the actual images, such that the actual image need only be fetched when actually needed to be presented. It should be realized that the metadata may alternatively be stored together with the respective image in a common database.

The metadata may be of several different types. Metadata may comprise a geographical position of an image capturing sensor when acquiring the image, and/or a viewing angle of the image capturing sensor when acquiring the image. Such information may be directly acquired from a camera capturing the image, if the camera also comprises a GPS sensor and a compass.

Metadata may further comprise other information which may be captured simultaneously with the capturing of the image, such as a date and time stamp, an identifier of a user capturing the image, and camera intrinsic information, such as a model of the camera, focal length or exposure time.

Metadata may also comprise image content information. Such information may be obtained by analyzing the image or by input from a user. The image content information may comprise information regarding local interest points and features, which may be obtained e.g. by Scale-Invariant Feature Transform (SIFT), Speeded-Up Robust Features (SURF), Oriented FAST (features from accelerated segment test) and Rotated BRIEF (binary robust independent elementary features) (ORB), Karhunen-Loève Transform (KLT), Gradient Location and Orientation Histogram (GLOH), or Local Energy based Shape Histogram (LESH). The image content information may further comprise a Bag-Of-Words (BOW) representation of local features in the image, i.e. a histogram of quantized local features against a dictionary of objects that are present in the set of images. The image content information may further comprise a scene classification label, which may e.g. provide a classification whether the image depicts an urban or natural scene.

Metadata may also comprise image property information. The image property information may also be obtained by analyzing the image. The image property information may comprise information of brightness of the image, such as a measure of the intensity of the image. The image property information may further comprise color properties of the image, such as a color histogram providing intensity distribution of different color channels in the image. The image property information may also comprise blurriness information providing a measure of how blurred the image is. The image property information may be provided as averaged features of the entire image or as local features for a part of the image.

In addition to extracting metadata relating to images, the system 100 in which images are stored may also be arranged to construct three-dimensional structures of objects in the scenery.

A method for constructing a model of a scenery may comprise creating a plurality of sub-models. Each sub-model may provide a reconstruction of at least part of the scenery based on a sub-set of the plurality of images. Each sub-model defines relative positions and viewing angles of the image capturing sensors acquiring the images on which the sub-model is formed. The sub-model further defines three-dimensional structures of objects depicted in the plurality of images.

The method further comprises separately merging the defined relative positions and viewing angles of image capturing sensors for the plurality of sub-models. Thus, the three-dimensional structures of objects are not required when merging the positions and viewing angles of the image capturing sensors. This implies that the merging may be rather quickly performed, since only a fraction of the information of the sub-models is used in the merging.

The merging may provide a very accurate modeling of the relative positions and viewing angles of image capturing sensors. The merging may also use additional information in order to improve the modeling and which may allow determining absolute positions and viewing angles of the image capturing sensors.

When the absolute positions and viewing angles of the image capturing sensors have thus been determined, this information may be used in order to compute the three-dimensional structures of objects in the scenery. The three-dimensional structures of objects in the scenery may be stored in a separate, third database 106, or in a common database with the images and/or metadata of the images.

The absolute positions and viewing angles of the image capturing sensors thus obtained in the computation of the three-dimensional structures of objects in the scenery may be used for updating corresponding metadata of the images in the database 104.

Further, a three-dimensional reconstruction index may be assigned to a sub-model for creating a three-dimensional structure of objects in the scenery. Metadata of an image may also include the three-dimensional reconstruction index of the sub-model of which the image is part. Thus, images sharing three-dimensional reconstruction index may be concluded to be similar, as they contribute to forming a three-dimensional reconstruction of common objects and the position and viewing angle of the images are based on the common three-dimensional reconstruction.

The system 100 may provide interface(s) for accessing information in the databases 102, 104, 106. For instance, the system 100 may comprise an Application Programming Interface (API) 108, which provides a set of pre-defined instructions that an application may use in order to obtain information from the system 100.

The system 100 may be implemented in one or more servers, which may be accessible through a computer network, such as a Local Area Network (LAN), a Wide Area Network (WAN), or the Internet.

An application may provide a user with a possibility to view images in the set of image and to switch which image that is to be viewed so that the user may experience navigation through the set of images.

When navigating through the set of images, it may be desired that a switch from a first image to a second image provides a good user experience. Such a switch may be called a transition between the images. A good transition between images may occur when the images are sufficiently similar.

Thus, a measure of similarity may be used in order to determine whether a transition between images will provide a good user experience. The measure of similarity may take many aspects into account, such as whether the images are geographically close, or whether image properties are similar. For instance, if one image is captured in daylight and another is captured at night, a transition between the images may not provide a good user experience even if the images are geographically close.

An importance of different measures of similarity may depend on an application for navigating through the set of images. Thus, it may not be desired to calculate measures of similarity in advance in the system 100 that stores the images, since there may be a desire to adapt the measures of similarity to a specific application.

The system 100 provides access to information about the images that allows fast calculation of measures of similarity such that transitions between images may be determined during navigation through the set of images, or "on-the-fly".

Figure 2:
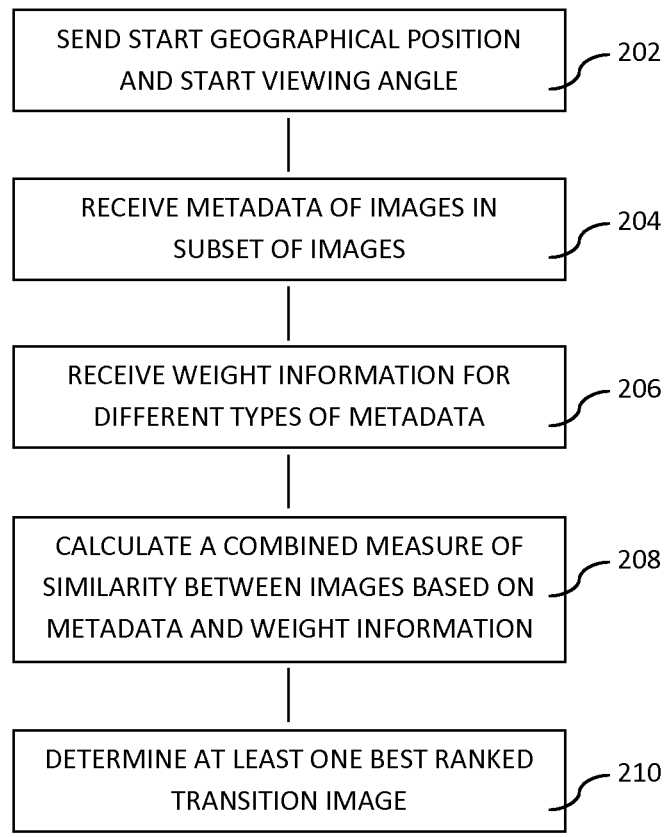
FIG. 2 is a flowchart of a method for navigating through a set of images.

Referring now to FIG. 2, a method for navigating through a set of images will be described.

The method may be implemented by an application that accesses the system 100. The application may be any set of computer instructions that may cause a processing unit to perform the method. For example, the application may thus be a computer program installed and run on a computing device, such as program run on a desktop computer or an application run on a mobile phone. The application may be a browser application, a JavaScript library, or a widget for accessing information over the Internet. The method may alternatively be performed by a server having access to the databases 102, 104, 106. An application may thus request the server to perform method steps for navigation and receive results from the server for display to a user.

The method may start at display of a current image within the set of images. The current image may define a start geographical position and start viewing angle. Alternatively, a geographical position of interest, such as a current position of the user, and a viewing angle, such as provided by a compass direction relevant to the user, may be provided as input.

The start geographical position and start viewing angle may be sent to the system 100, step 202. It is determined that navigation in the scenery is to be performed around the start geographical position and start viewing angle.

The system 100 may determine a subset of images based on the start geographical position and start viewing angle as input. The subset of images may constitute a selection of images based on metadata.

A number of selection criteria may be used for determining the selection of images that are to form the subset of images. The selection criteria may be based on metadata of the images. The selection criteria may use any combination of types of metadata, and for each type of metadata a range of acceptable values may be determined. Each image meeting all the selection criteria may then be included into the subset of images.

The selection criteria may include a geographical position within a bounding area surrounding the start geographical position. The bounding area may be any type of area, which may have a simple or complex shape. For instance, the bounding area may be a circle with the start geographical position at center of the circle. Alternatively, the bounding area may be a square or rectangle surrounding the start geographical position. The bounding area may extend farther in directions, in which the user is more likely to navigate. For instance, the bounding area may have a large extension in a direction corresponding to the start viewing angle and opposite to the start viewing angle.

The selection criteria may further include a viewing angle within an angular range of the start viewing angle.

The selection criteria may further or alternatively include a given time interval, user identifications, etc.

Metadata of the images in the subset of images may be received, step 204. The metadata may include all metadata of the images or selected metadata. In particular, the metadata may include one or more of a geographical position of the image capturing sensor when acquiring the image, a viewing angle of the image capturing sensor, image content information and image property information.

Only the metadata may be provided from the database 104. Actual images need not be retrieved until the image is to be presented on a display.

A weight to be given to different types of metadata may differ depending on an application providing the navigation. Thus, the application may provide weight information, or a user may define weight information. The weight information defines weights to be given to measures of similarity between images. The weight information is thus received by a processor for calculating measures of similarity, step 206, which may e.g. be a processor on which the application is run or the server in the system 100.

Then, the current image is compared to images within the subset of images. Each comparison may include calculating a combined measure of similarity between the images based on the metadata of the images and the weight information, step 208.

Based on the calculated plurality of combined measures of similarity, at least one best ranked transition image among the images within said subset of images may be determined, step 210. The at least one best ranked transition image may be the image having the highest measure of similarity.

The at least one best ranked transition image may thus be presented as a candidate for navigation through the set of images.

The combined measures of similarity may be calculated between further pairs of images within the subset of images. Thus, a local graph may be formed, which may then be used for further navigation through the subset of images.

Figure 3:
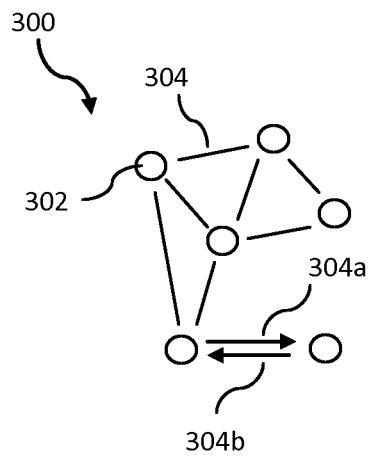
FIG. 3 is a schematic view of a graph representation.

Referring now to FIG. 3, a graph representation 300 of correlation of images will be further described. The graph representation 200 comprises nodes 302 and edges 304, each connecting two nodes 302.

A node 302 in the graph 300 represents an image. An edge 304 in the graph 300 connects two nodes 302 to each other. The edge 304 represents a transition between the two images represented by the two nodes 302 connected by the edge 304. The edge 304 comprises similarity information providing a plurality of measures of similarities between the two images.

The measures of similarities may quantify the similarity between the two images based on any of the types of image information provided in the nodes 302.

The pairwise correlations or relationships between the images are quantified in order to allow selecting edges 304 between nodes 302 in a geographically and visually related manner. For example, the following measures of similarities may be computed or extracted between image nodes: a geographical distance measure, a relative position, a relative viewing angle, a color difference, a BOW difference, a geometric relationship, a number of feature matches with the corresponding geometric verification, and a measure relating to whether images share a three-dimensional reconstruction index.

Specifically, the geographical distance d and the relative position $P_r$ between two nodes 302 may be computed given the longitude and latitude values of the nodes 302. Relative viewing angle $A_r$ may be derived either from the compass direction of the nodes 302 or from relative pose estimation that may be determined based on three-dimensional reconstructions.

The color difference $C_d$ and the BOW difference $B_d$ may be calculated based on the difference between the color histograms and the BOW histograms. The difference between histograms may be any distance measure between two vectors of the same length e.g. a distance in normalized $l_2$-norm or $l_1$-norm. The color difference $C_d$ may form a measure of difference in image property between the images, whereas the BOW difference $B_d$ may form a measure of difference in image content between the images.

The measures of similarities may also comprise further measures of differences in metadata. For instance, the capture times of the images may be used in several different ways. As one measure of difference in metadata, an absolute difference in time may be used. However, other differences in capture time may be used, such as a difference in time of day or a difference in time of year. A difference in time of day may provide an indication of the light conditions in the image, e.g. if the image is captured at night time or in broad daylight. A difference in time of year may provide an indication of the season, which may affect the environment depicted in the images, such as whether trees have leaves or not.

A difference in metadata may be expressed as a binary match, e.g. whether the user identifier is the same or whether the images are part of a common temporal sequence. Also, a time of year information may be used as a binary match indicating whether the images are captured in a common season. Further, a three-dimensional reconstruction index may be used as a binary match.

The similarity information of an edge may comprise transition classifier information, which classifies the transition between the two images into one of a number of predefined classes. These predefined classes may classify transitions into different movements and may therefore use the geographical position and a viewing angle as given e.g. by the compass direction. With regard to the relative position $P_r$ between the images and the relative viewing angle $A_r$ of the images, types of transition between the two images may be defined.

Figure 4:
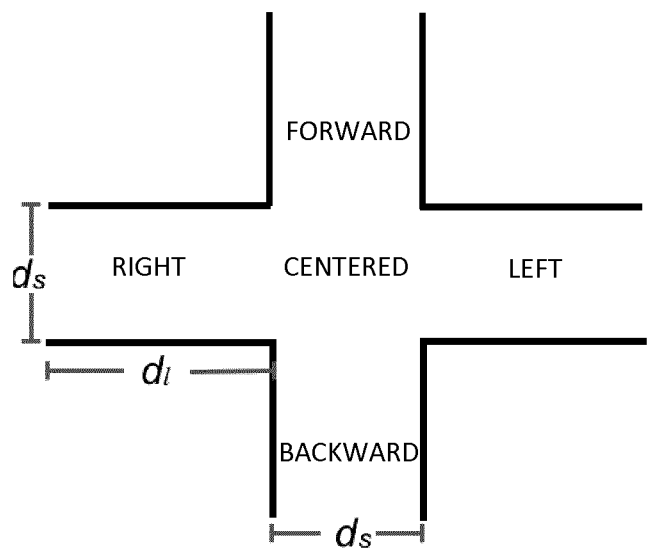
FIG. 4 is a schematic view indicating classification of transitions between images into predefined classes.

Referring now to FIG. 4, an example of classification of types of transitions is shown. The relative position $P_r$ between a first image and a second image may be quantized to one of the classes "centered", "forward", "backward", "left" and "right". As shown in FIG. 4, the relative position $P_r$ of the second image in relation to the first image is considered in two directions, a forward-backward direction and a left-right direction. If the relative position $P_r$ is within a distance $d_s$ in both directions, the relative position $P_r$ is quantized as "centered". If the relative position $P_r$ is within a distance $d_l$ in one direction and within a distance $d_s$ in the other direction, the relative position $P_r$ is quantized as "forward", "backward", "left", or "right". Similarly, the relative viewing angle $A_r$ may be quantized as "forward", "backward", "left", or "right".

The combinations of the relative position $P_r$ and the relative viewing angle $A_r$ may be used for forming the types of transitions. For example, the combination of $P_r$="centered" and $A_r$="backward" may be defined as the class "turning-around".

Using classification of types of transitions, the edges 304 in the graph 300 may need to be directed edges 304 representing a direction between nodes 302 in the graph 300. Hence, two nodes 302 may be connected by two edges 304, wherein a first edge 304a represents a transition from a first image represented by a first node to a second image represented by a second node and a second edge 304b represents a transition from the second image represented by the second node to the first image represented by the first node. For instance, if the first edge 304a has transition classifier information corresponding to "moving forward", then the second edge 304b would have transition classifier information corresponding to "moving backward".

Each edge 304 may provide a combined measure of similarity using the similarity information of the edge 304. The combined measure of similarity may be formed as a weighted sum of the plurality of measures of similarities of the edge 304. The combined measure of similarity may also be formed using a sum/norm of any linear combination of the similarity measures. The combined measure of similarity may also be formed using any type of classifier function that gives a scalar value, such as Support Vector Machine (SVM) or probabilistic classifiers such as Bayes classifier.

For instance, a measure of similarity based on the three-dimensional reconstruction index may be given a high weight, since if two images are part of the same sub-model it is an indication that a smooth transition between the images may be provided.

The graph representation 300 allows comparison of the edges 304 from a node 302 in order to find a best ranked transition from the node 302, by finding the edge 304 from the node 302 with the highest score of the combined measure of similarity. The best ranked transition from the node 302, may also be found by applying one or more classifiers on the combined measures of similarity of the edges 304. For example, a hyperplane, a support vector machine (SVM) or a deep neural network may be applied.

Starting from a current node 302, which may represent an image that is currently viewed by an application, a list of the top ranked transitions from the current node 302 may be determined. Hence, a plurality of best ranked transition images may be found so as to enable the application to select one of the images from the list.

Figure 5:
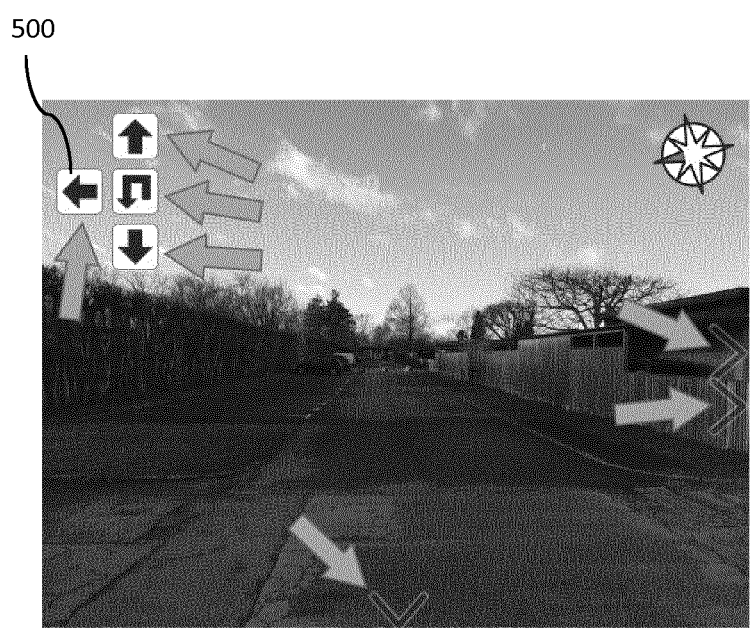
FIG. 5 is a view of an image illustrating available transitions from the image.

An application may want to determine the best ranked transition image(s) according to any possible type of transition in advance of the user requesting that such transition is performed. Hence, when an image is to be presented by the application, the application may determine the best ranked transition image(s) for each type of transition from the image that is to be presented by the application. Then, a list of best ranked transition image(s) for each type of transition may be returned to the application. The application may present to the user an indication of which types of transitions that are possible from the image currently being presented, as shown in FIG. 5, where arrows 500 indicate the available types of transitions.

It may be desirable to present a sequence of images, providing a movement through the scenery. The application may allow a user to select a start geographical position and a target geographical position, e.g. in a map, in order to define a path through the scenery.

The application may determine a set of possible start nodes within a geographical distance d from the start geographical position and a set of possible target nodes within a geographical distance d from the target geographical position. Then, a best ranked path through the graph 300 from a start node to a target node may be determined.

The application may provide the indications of the start geographical position and/or the target geographical position as explicit indications of the desired nodes in the graph 300. For instance, the start geographical position may be provided as the current image that is presented by the application.

A user may define that an image transition is to be performed in order to effectuate navigation. The actual new image to be presented may thus be fetched from the database 102 for presentation.

When navigation through the set of images occurs, the geographical position of the image currently presented to the user is changed. A bounding area may thus be updated such that an updated subset of images is provided. Then, the graph 300 may be updated based on the updated subset of images. In this way, the application may have a relatively small graph representation of transitions between a relatively small subset of images in which it is likely that navigation is to occur. By means of updating of the graph 300, it may be ensured that navigation does not need to occur to images not represented in the graph 300.

The updating of the bounding area may be based on movements through the scenery, such that the bounding area may extend farther in directions of movements.

The person skilled in the art realizes that the present invention by no means is limited to the preferred embodiments described above. On the contrary, many modifications and variations are possible within the scope of the appended claims.

The invention claimed is:

1. A method for navigating through a set of images depicting a scenery, said method comprising:
   receiving information relating to a subset of images within said set of images, said information comprising metadata of each image within said subset of images, said metadata including a geographical position of an image capturing sensor when acquiring the corresponding image, a viewing angle of the image capturing sensor when acquiring the corresponding image, and image property information, wherein said subset of images is selected from the set of images based upon each image in the subset of images being acquired from a geographical position within a bounding area defined in relation to a start geographical position of navigation and a target geographical position of navigation;
   receiving weight information for determining similarities between images within said subset of images, said weight information controlling weights to be provided for determining a plurality of different measures of similarities between images within said subset of images based on different types of metadata;
   calculating a plurality of combined measures of similarity between pairs of images in the subset of images, each combined measure of similarity representing a similarity between the images in a pair of images within said subset of images, said calculating being performed using said metadata and said weight information;
   generating a graph representation, wherein at least one node in the graph representation is associated with an image included in the subset of images and at least one edge in the graph representation is associated with a transition between two images included in the subset of images, and said generating the graph representation is associated with said calculating of the plurality of combined measures of similarity;
   receiving an indication of a target geographical position associated with a distance in a direction relative to a viewing angle of a current image; and
   determining a best ranked path from a first image in the subset of images to a second image in the subset of images, wherein the first image has a geographical position within a distance from the start geographical position that is smaller than a set threshold, the second image has a geographical position within a distance from the target geographical position that is smaller than a set threshold, and the path comprises a number of transitions between images from the first image via intermediate images to the second image; said determining comprising:
      calculating a transition measure of a path from the first image to the second image as a sum of the combined measures of similarity between pairs of images included in the transitions and associated with a starting node representing the first image and a target node representing the second image in the graph representation; and
      selecting the best ranked path based on a comparison of the transition measures for paths from the first image to the second image.

2. The method of claim 1, further comprising determining at least one best ranked transition image among the images within said subset of images based on said plurality of combined measures of similarity.

3. The method of claim 1, further comprising classifying a transition between two images within said set of images into a class among a predefined, finite number of transition classes, wherein each predefined transition class defines a type of transition between the two images according to a difference in the geographical position and a difference in the viewing angle of the two images.

4. The method of claim 1, wherein said metadata includes a three-dimensional reconstruction index indicating that the image is part of a particular sub-model of three-dimensional structure of objects in the scenery having the three-dimensional reconstruction index.

5. The method of claim 1, wherein the bounding area is updated based on navigation through the set of images.

6. The method of claim 1, wherein the bounding area is determined based on the viewing angle of the current image.

7. The method of claim 1, further comprising sending a request for information relating to the subset of images, wherein said request comprises an indication of the current image.

8. A system for navigating through a set of images depicting a scenery, said system comprising:
a processor configured to:
receive information relating to a subset of images within said set of images, said information comprising metadata of each image within said subset of images, said metadata including a geographical position of an image capturing sensor when acquiring the corresponding image, a viewing angle of the image capturing sensor when acquiring the corresponding image, and image property information, wherein said subset of images is selected from the set of images based upon each image in the subset of images being acquired from a geographical position within a bounding area defined in relation to a start geographical position of navigation and a target geographical position of navigation;
receive weight information for determining similarities between images within said subset of images, said weight information controlling weights to be provided for determining a plurality of different measures of similarities between images within said subset of images based on different types of metadata;
calculate a plurality of combined measures of similarity between pairs of images in the subset of images, each combined measure of similarity representing a similarity between the images in a pair of images within said subset of images, said calculating being performed using said metadata and said weight information;
generate a graph representation, wherein at least one node in the graph representation is associated with an image included in the subset of images and at least one edge in the graph representation is associated with a transition between two images included in the subset of images, and said generating the graph representation is associated with said calculating of the plurality of combined measures of similarity;
receive an indication of a target geographical position associated with a distance in a direction relative to a viewing angle of a current image; and
determine a best ranked path from a first image in the subset of images to a second image in the subset of images, wherein the first image has a geographical position within a distance from the start geographical position that is smaller than a set threshold, the second image has a geographical position within a distance from the target geographical position that is smaller than a set threshold, and the path comprises a number of transitions between images from the first image via intermediate images to the second image, and wherein the processor is configured to determine said best ranked path including by being configured to: calculate a transition measure of a path from the first image to the second image as a sum of the combined measures of similarity between pairs of images included in the transitions and associated with a starting node representing the first image and a target node representing the second image in the graph representation, and select the best ranked path based on a comparison of the transition measures for paths from the first image to the second image; and
a memory coupled to the processor and configured to provide the processor with instructions.

9. The system of claim 8, wherein the processor is further configured to determine at least one best ranked transition image among the images within said subset of images based on said plurality of combined measures of similarity.

10. The system of claim 8, wherein the processor is further configured to classify a transition between two images within said set of images into a class among a predefined, finite number of transition classes, wherein each predefined transition class defines a type of transition between the two images according to a difference in the geographical position and a difference in the viewing angle of the two images.

11. The system of claim 8, wherein said metadata includes a three-dimensional reconstruction index indicating that the image is part of a particular sub-model of three-dimensional structure of objects in the scenery having the three-dimensional reconstruction index.

12. The system of claim 8, wherein the bounding area is updated based on navigation through the set of images.

13. The system of claim 8, wherein the bounding area is determined based on the viewing angle of the current image.

14. The system of claim 8, wherein the processor is further configured to send a request for information relating to the subset of images, wherein said request comprises an indication of the current image.

15. A computer program product for navigating through a set of images depicting a scenery, embodied in a non-transitory computer readable medium and comprising computer instructions for:
receiving information relating to a subset of images within said set of images, said information comprising metadata of each image within said subset of images, said metadata including a geographical position of an image capturing sensor when acquiring the corresponding image, a viewing angle of the image capturing sensor when acquiring the corresponding image, and image property information, wherein said subset of images is selected from the set of images based upon each image in the subset of images being acquired from a geographical position within a bounding area defined in relation to a start geographical position of navigation and a target geographical position of navigation;
receiving weight information for determining similarities between images within said subset of images, said weight information controlling weights to be provided for determining a plurality of different measures of similarities between images within said subset of images based on different types of metadata;
calculating a plurality of combined measures of similarity between pairs of images in the subset of images, each combined measure of similarity representing a similarity between the images in a pair of images within said subset of images, said calculating being performed using said metadata and said weight information;
generating a graph representation, wherein at least one node in the graph representation is associated with an image included in the subset of images and at least one edge in the graph representation is associated with a transition between two images included in the subset of images, and said generating the graph representation is associated with said calculating of the plurality of combined measures of similarity;
receiving an indication of a target geographical position associated with a distance in a direction relative to a viewing angle of a current image; and
determining a best ranked path from a first image in the subset of images to a second image in the subset of images, wherein the first image has a geographical position within a distance from the start geographical position that is smaller than a set threshold, the second image has a geographical position within a distance from the target geographical position that is smaller than a set threshold, and the path comprises a number of transitions between images from the first image via intermediate images to the second image; said determining comprising:

calculating a transition measure of a path from the first image to the second image as a sum of the combined measures of similarity between pairs of images included in the transitions and associated with a starting node representing the first image and a target node representing the second image in the graph representation; and selecting the best ranked path based on a comparison of the transition measures for paths from the first image to the second image.

16. The computer program product of claim 15, further comprising computer instructions for determining at least one best ranked transition image among the images within said subset of images based on said plurality of combined measures of similarity.

17. The computer program product of claim 15, further comprising computer instructions for classifying a transition between two images within said set of images into a class among a predefined, finite number of transition classes, wherein each predefined transition class defines a type of transition between the two images according to a difference in the geographical position and a difference in the viewing angle of the two images.

18. The computer program product of claim 15, wherein said metadata includes a three-dimensional reconstruction index indicating that the image is part of a particular sub-model of three-dimensional structure of objects in the scenery having the three-dimensional reconstruction index.

19. The computer program product of claim 15, wherein the bounding area is determined based on the viewing angle of the current image and updated based on navigation through the set of images.

20. The computer program product of claim 15, further comprising computer instructions for sending a request for information relating to the subset of images, wherein said request comprises an indication of the current image.

* * * * *